(12) United States Patent
Suzuki (10) Patent No.: US 7,949,243 B2
(45) Date of Patent: May 24, 2011

(54) OPTICAL APPARATUS

(75) Inventor: Nobuyoshi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 12/559,025

(22) Filed: Sep. 14, 2009

(65) Prior Publication Data

US 2010/0067889 A1 Mar. 18, 2010

(30) Foreign Application Priority Data

Sep. 16, 2008 (JP) .................................. 2008-236456

(51) Int. Cl.
*G03B 17/00* (2006.01)
(52) U.S. Cl. ......................... 396/55; 348/208.7; 359/554
(58) Field of Classification Search .................... 396/52, 396/55; 348/208.4, 208.7, 208.8; 359/554, 359/555, 557, 819, 826
See application file for complete search history.

(56) References Cited

U.S. PATENT DOCUMENTS 6,819,500 B2 11/2004 Tsuzuki 7,768,727 B2 * 8/2010 Iida ................................ 359/826

FOREIGN PATENT DOCUMENTS

JP 2003-295249 10/2003

* cited by examiner

*Primary Examiner* — Clayton E Laballe
*Assistant Examiner* — Autumn Parker
(74) *Attorney, Agent, or Firm* — Cowan, Liebowitz & Latman, P.C.

(57) ABSTRACT

An optical apparatus includes an anti-shake lens L3 shifting with respect to an optical axis AXL of an optical system, a movable lens L4 moving along the optical axis, a light intensity controlling member 5 controlling light intensity, first and second actuators including magnets 33a and 33b and coils 34a and 34b, respectively, which shifts the anti-shake lens to directions different from each other, a third actuator including a magnet 63 and a coil 54 which moves the movable lens, a fourth actuator 51 which operates the light intensity controlling member, and a barrel member 7 which contains the anti-shake lens, the movable lens, the light intensity controlling member, and the first to the fourth actuators. The first to the fourth actuators are disposed inside the barrel member so as not to overlap with one another when viewed in an optical axis direction.

10 Claims, 12 Drawing Sheets

OPTICAL APPARATUS

BACKGROUND OF THE INVENTION

1. Field of the Invention

The present invention relates to an optical apparatus which has an anti-shake lens, a movable lens, and an actuator driving each of light intensity controlling members such as an aperture and a shutter.

2. Description of the Related Art

An optical apparatus such as an image pickup apparatus or an interchangeable lens is provided with a movable lens which is movable along an optical axis of an optical system for performing variable magnification or focus adjustment and an actuator which moves it. Such an optical apparatus is often provided with an anti-shake mechanism which is constituted by an anti-shake lens capable of shifting with respect to the optical axis of the optical system and two actuators shifting it in a pitch direction and a yaw direction in order to reduce an image shake caused by a so-called hand shake.

As an actuator for shifting the anti-shake lens, generally, an actuator constituted by a coil and a magnet is used. On the other hand, as an actuator for moving the movable lens, a rotational type motor or a linear actuator constituted by a coil and a magnet (voice coil motor) may be used.

Further, such an optical apparatus is provided with a light intensity controlling member such as an ND filter and a shutter, and an actuator which drives each of them.

Japanese Patent Laid-open No. 2003-295249 discloses an optical apparatus in which a lens moving actuator for moving a movable lens is disposed at a position symmetric to one of two anti-shake actuators for shifting an anti-shake lens with reference to an optical axis position. Such an arrangement enables the optical apparatus to be miniaturized in a radial direction and an optical axis direction. In the optical apparatus disclosed in Japanese Patent Laid-open No. 2003-295249, an aperture actuator and an ND actuator are disposed outside a barrel.

On the other hand, when a lens retraction type optical apparatus is provided with a moving actuator, an anti-shake actuator, and a light intensity controlling member actuator, all of these actuators need to be disposed inside the barrel. In this case, for example, the anti-shake actuator and the light intensity controlling member actuator may be disposed so as to overlap with each other when viewed in the optical axis direction and disposed closely in the optical axis direction.

However, in a configuration of the anti-shake actuator disclosed in Japanese Patent Laid-open No. 2003-295249, most of magnetic force of the magnet is emitted in the optical axis direction. Therefore, when adopting the arrangement as described above, the anti-shake actuator and the light intensity controlling member actuator are magnetically interfered with each other, and it may influence on each motion.

BRIEF SUMMARY OF THE INVENTION

The present invention provides an optical apparatus capable of relieving a magnetic interference between actuators.

An optical apparatus as one aspect of the present invention includes an anti-shake lens capable of shifting with respect to an optical axis of an optical system, a movable lens capable of moving along the optical axis, a light intensity controlling member configured to control light intensity passing through the optical system, first and second actuators, each of which includes a magnet and a coil, configured to shift the anti-shake lens to directions different from each other, a third actuator, which includes a magnet and a coil, configured to move the movable lens, a fourth actuator configured to operate the light intensity controlling member, and a barrel member which contains the anti-shake lens, the movable lens, the light intensity controlling member, and the first to the fourth actuators. The first to the fourth actuators are disposed inside the barrel member so as not to overlap with one another when viewed in an optical axis direction.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Figure 1:
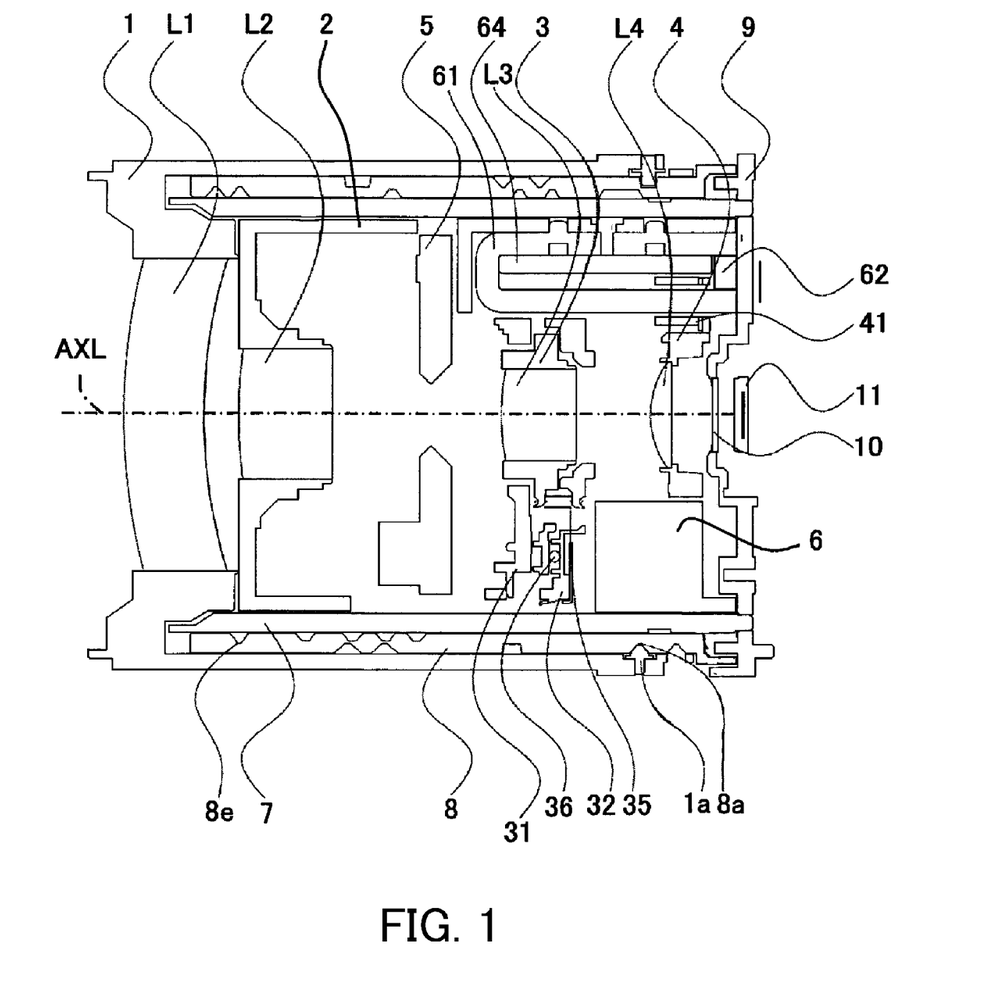
FIG. 1 is a side cross-sectional view showing a configuration of a lens barrel (retracted position) of an image pickup apparatus that is an embodiment of the present invention.
Figure 2:
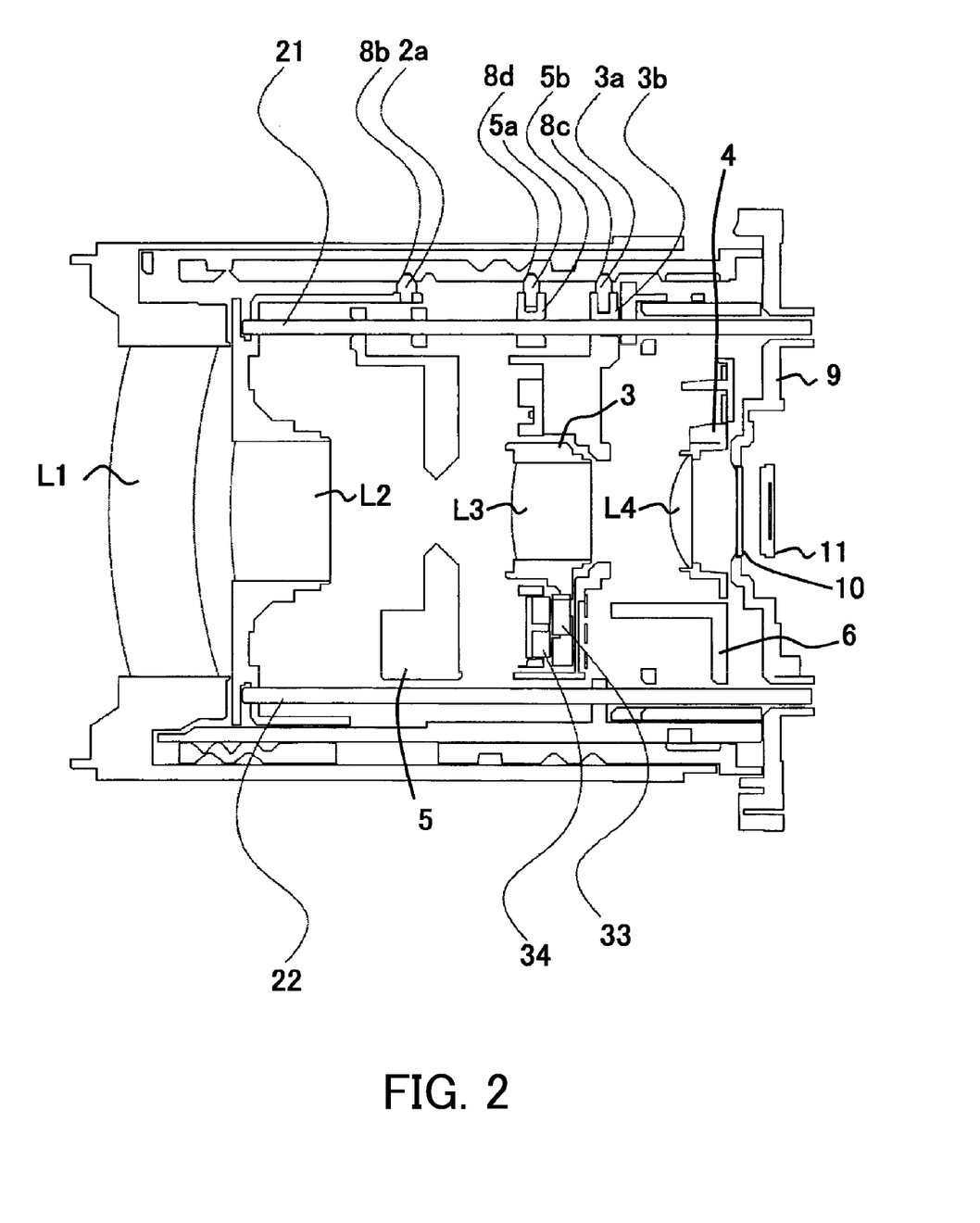
FIG. 2 is an upper cross-sectional view showing a configuration of a lens barrel (retracted position) of the embodiment.
Figure 3:
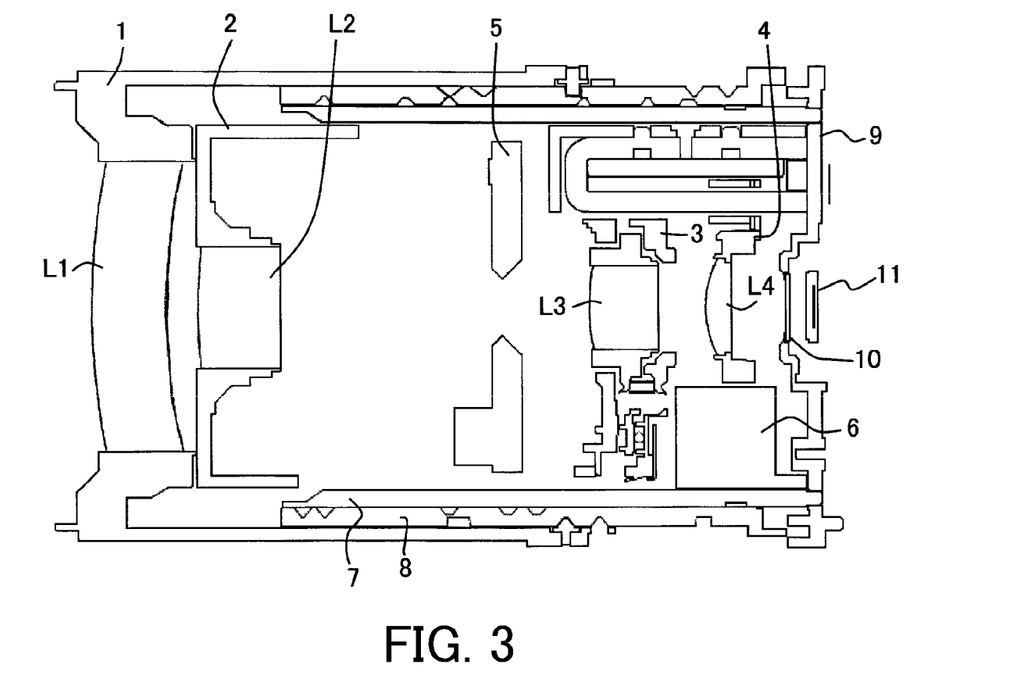
FIG. 3 is a side cross-sectional view showing a configuration of the lens barrel (WIDE position).
Figure 4:
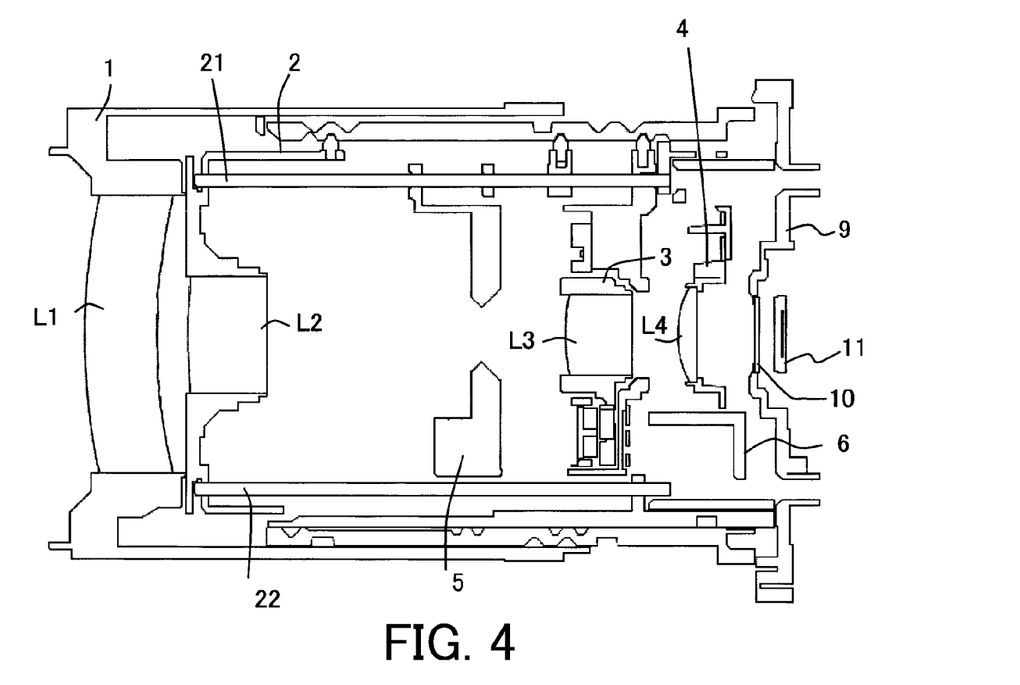
FIG. 4 is an upper cross-sectional view showing a configuration of the lens barrel (WIDE position).
Figure 5:
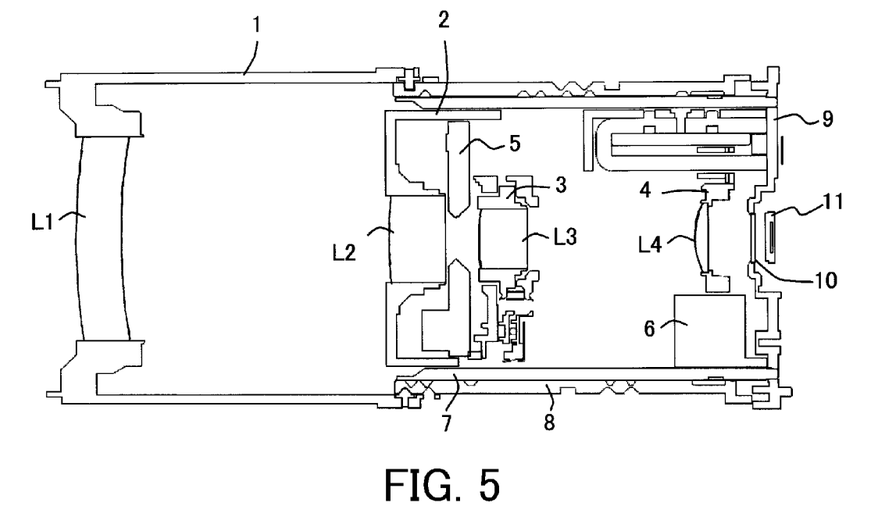
FIG. 5 is a side cross-sectional view showing a configuration of the lens barrel (TELE position).
Figure 6:
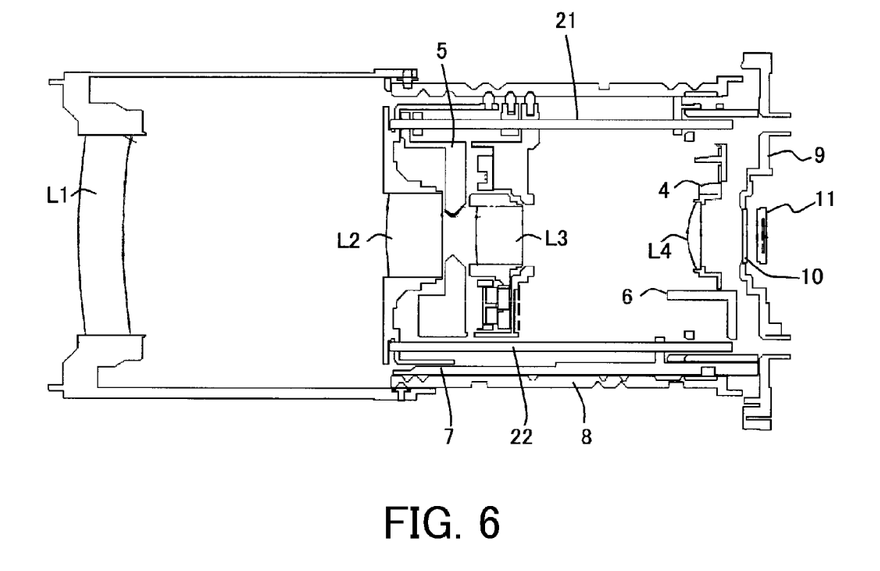
FIG. 6 is an upper cross-sectional view showing a configuration of the lens barrel (TELE position).

FIGS. 1 to 6 show configurations of a lens barrel of an image pickup apparatus (a digital still camera or a video camera) as an optical apparatus that is an embodiment of the present invention. FIG. 1 is a side cross-sectional view of the lens barrel at a retracted position (a storage position), and FIG. 2 is an upper cross-sectional view of the lens barrel at the retracted position. FIG. 3 is a side cross-sectional view of the lens barrel at a WIDE position (a shooting position), and FIG. 4 is an upper cross-sectional view of the lens barrel at the WIDE position. FIG. 5 is a side cross-sectional view of the lens barrel at a TELE position (a shooting position), and FIG. 6 is an upper cross-sectional view of the lens barrel at the TELE position.

An optical system constituted by a first lens unit L1, a second lens unit L2, a third lens unit (a correction lens that is an anti-shake lens) L3, and a fourth lens unit (a focus lens that is a movable lens) L4, which are arranged in this order from an object side, is contained in the lens barrel. Reference symbol AXL denotes an optical axis of the optical system.

Reference numeral 1 denotes a first lens barrel which holds the first lens unit L1. A cam pin 1a is attached to each of three areas in a circumferential direction on an inner circumferential surface of the first barrel 1, and each cam pin 1a engages with corresponding one of three cam grooves 8a formed on an outer circumferential surface of a cam barrel 8. A straight groove (not shown) which extends in an optical axis direction is formed at each of the three areas in the circumferential direction on the inner circumferential surface of the first barrel 1, and a straight key (not shown) formed on an outer circumferential surface of a fixed barrel 7 engages with the straight groove.

Reference numeral 2 denotes a second barrel which holds the second lens unit L2. A cam pin 2a is attached to each of three areas in a circumferential direction on an outer circumferential surface of the second barrel 2. Each cam pin 2a engages with corresponding one of three cam grooves 8b formed on the inner circumferential surface of the cam barrel 8. The cam pin 2a engages with a straight groove (not shown) formed on the fixed barrel 7 so as to extend in the optical axis direction.

The fixed barrel 7 holds the first barrel 1 and the second barrel 2 so as not to rotate them. A cam pin (not shown) is attached to each of three areas in a circumferential direction on the outer circumferential surface of the fixed barrel 7, and each cam pin engages with corresponding one of three cam grooves 8e formed on an inner circumferential surface of the cam barrel 8.

Figure 7:
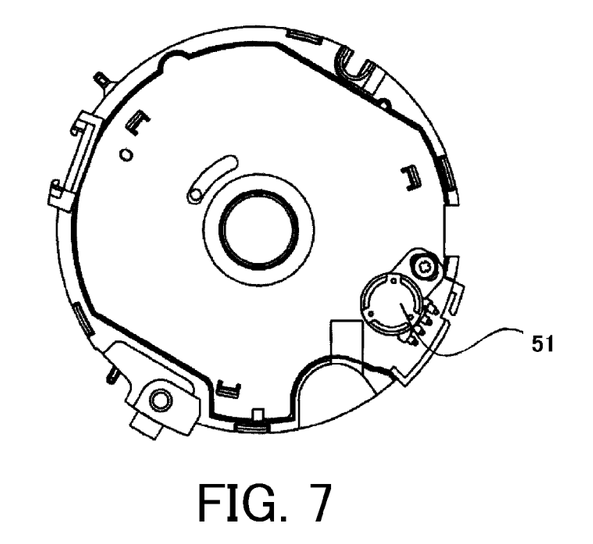
FIG. 7 is a back view of an aperture unit in the lens barrel.
Figure 8:
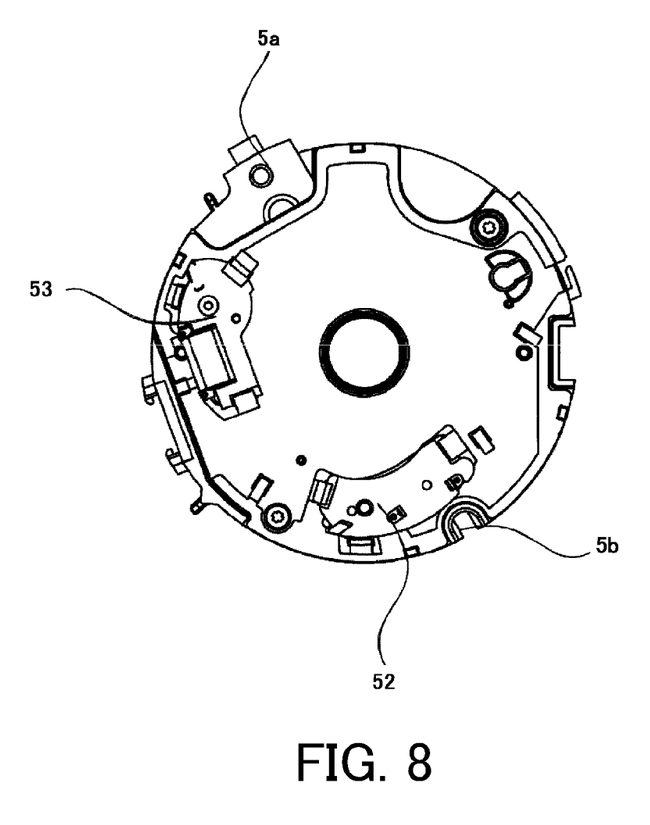
FIG. 8 is an elevation view of the aperture unit in the lens barrel.

Reference numeral 5 denotes an aperture unit. FIGS. 7 and 8 denote a back view and an elevation view of the aperture unit 5, respectively.

A cam pin 5a provided on an outer circumferential surface of the aperture unit 5 engages with a cam groove 8d formed on the inner circumferential surface of the cam barrel 8. A sleeve portion 5b and a rotation stopper (not shown) are formed on the aperture unit 5, and these engage with guide bars 21 and 22 supported by the second barrel 2 and an image pickup element base plate 9 described later so as to be movable in an optical axis direction.

Reference numeral 51 denotes an aperture actuator which performs an opening and closing drive of an aperture blade (not shown) provided in the aperture unit 5, and for example a stepping motor may be used. Reference numeral 52 denotes a shutter actuator which performs an opening and closing drive of a shutter blade provided in a shutter (not shown). Reference numeral 53 denotes an ND (neutral density) actuator which drives an ND filter (not shown).

The aperture unit 5 (the aperture blade), the shutter (the shutter blade), and the ND filter are a light intensity controlling member which controls a light intensity reaching an image plane (an image pickup element 11 described later) after passing through the optical system. The aperture actuator, the shutter actuator, and the ND actuator correspond to a fourth actuator (a light intensity controlling member actuator).

Reference numeral 3 denotes a third holding frame which holds the correction lens L3. The correction lens L3 and the third holding frame 3 are parts of the anti-shake unit. The third holding frame 3 is held so as to be able to shift in a direction orthogonal to the optical axis AXL (hereinafter, referred to as a direction orthogonal to the optical axis direction) by a sensor holding frame 32 of the anti-shake unit. Reference numeral 31 denotes a coil holding frame which constitutes a base portion of the anti-shake unit with the sensor holding frame 32.

Figure 11:
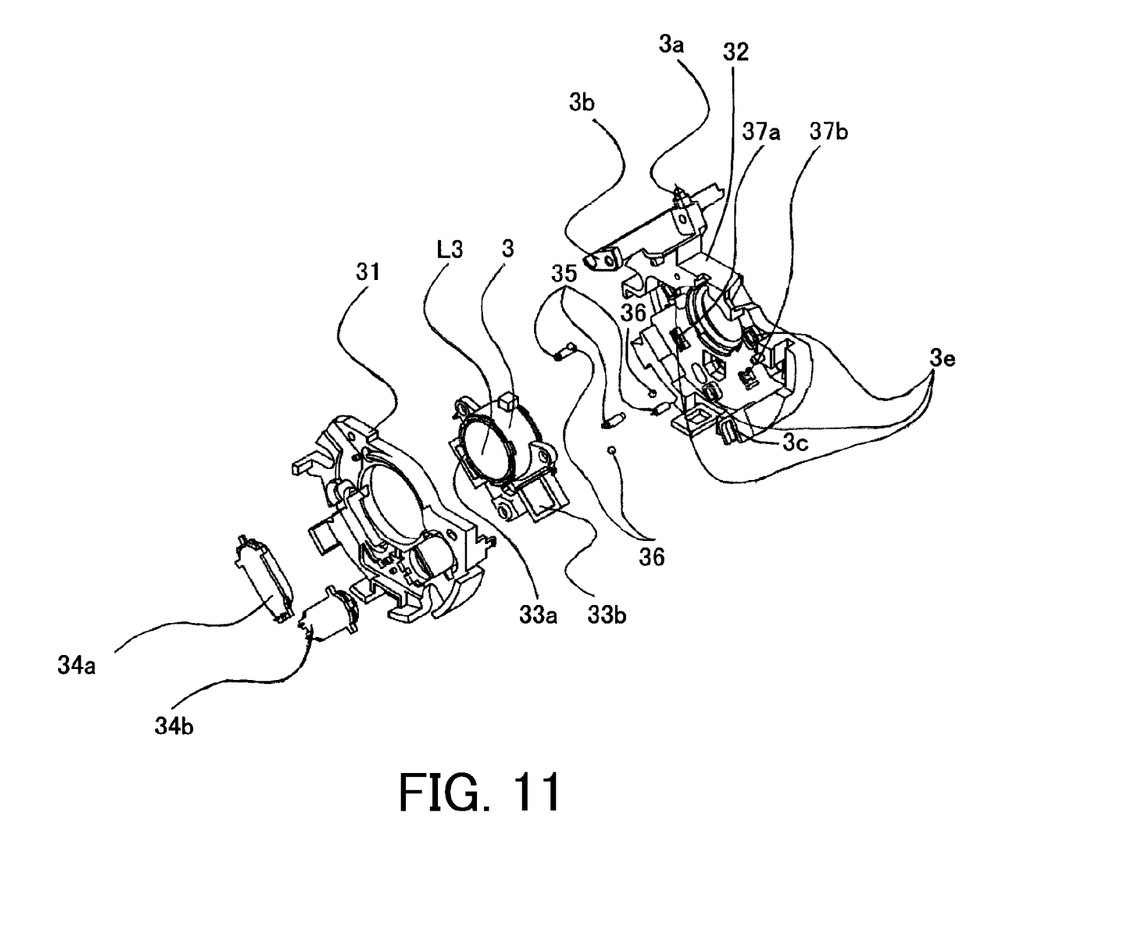
FIG. 11 is an exploded perspective view showing a configuration of an anti-shake unit in the lens barrel.
Figure 12:
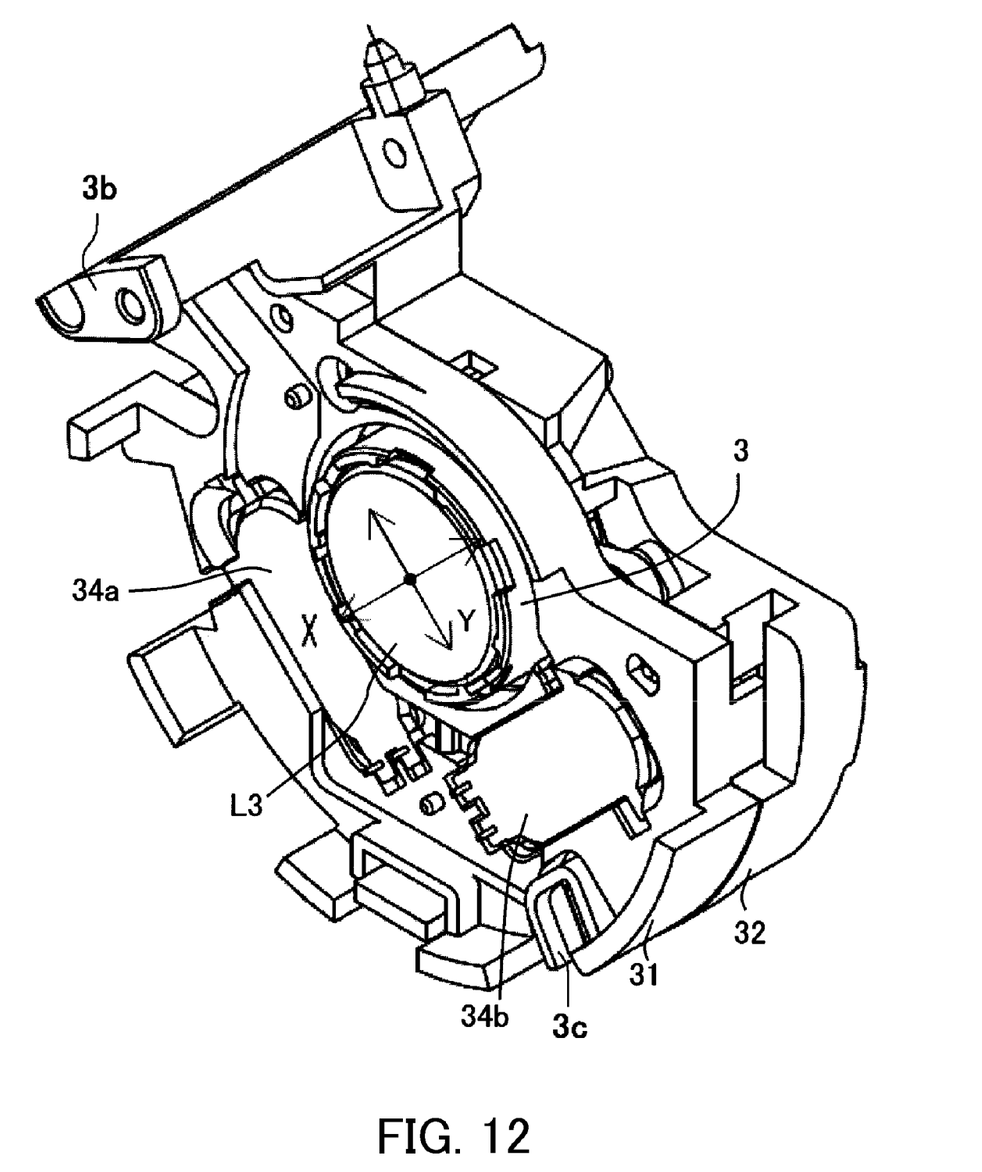
FIG. 12 is a perspective view showing an assembly completion state of the anti-shake unit.

A cam pin 3a is provided on an outer circumferential surface of the sensor holding frame 32, and the cam pin 3a engages with a cam groove 8c formed on an inner circumferential surface of the cam barrel 8. As shown in FIGS. 11 and 12, a sleeve portion 3b and a rotation stopper 3c are formed on the sensor holding frame 32. The sleeve portion 3b and the rotation stopper 3c respectively engage with the guide bars 21 and 22 supported by the second barrel 2 and the image pickup element base plate 9.

The guide bars 21 and 22 supported by the second barrel 2, as described above, hold the aperture unit 5 and the anti-shake unit so that they are movable in the optical axis direction but are not rotated.

Figure 9:
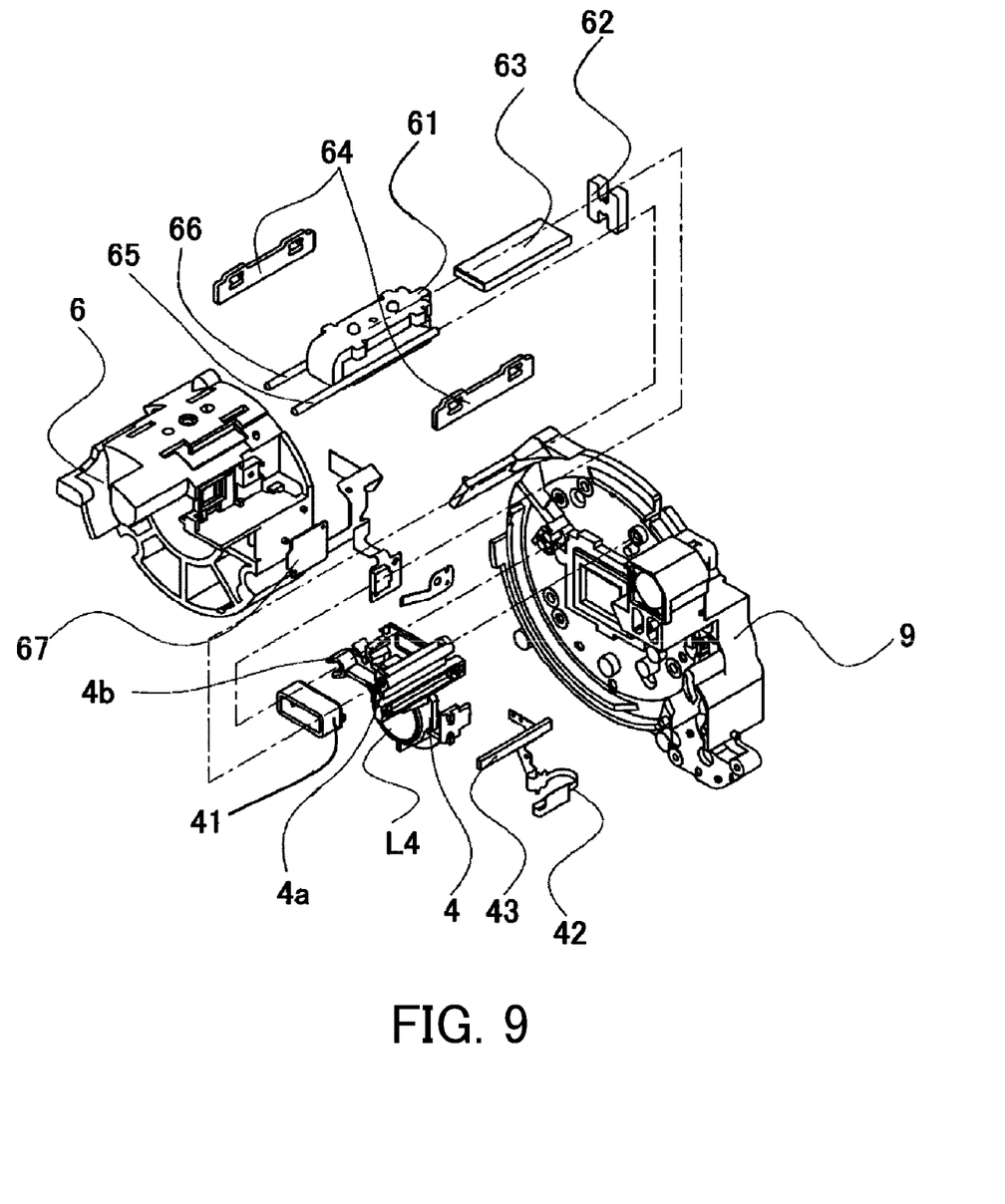
FIG. 9 is an exploded perspective view showing a configuration of a focus drive mechanism in the lens barrel.

Reference numeral 4 denotes a fourth holding frame which holds the focus lens L4, and as shown in FIG. 9, it has a sleeve portion 4a and a rotation stopper 4b. The sleeve portion 4a and the rotation stopper 4b engage with guide bars 65 and 66, respectively, supported by a focus base member 6 and the image pickup element base plate 9 so as to be movable in the optical axis direction.

A gear portion (not shown) is formed on an inner circumferential surface of the cam barrel 8, and a rotational force is transmitted to the gear portion via a gear array from a zoom motor (for example, a stepping motor) (not shown). Thus, the cam barrel 8 is rotationally driven. When the cam barrel 8 rotates, the cam barrel 8 rotationally moves in the optical axis direction by the engagement between a cam groove 8e formed in the cam barrel 8 and a cam pin provided on the fixed barrel 7.

The first barrel 1 moves in the optical axis direction without rotation, by the engagements between the cam pin 1a provided at the first barrel 1 and the cam groove 8a formed in the cam barrel 8 and between the straight groove formed in the first barrel 1 and the straight key provided on the fixed barrel 7. In other words, the lens barrel in the present embodiment performs a stretching motion in the optical axis direction.

The second barrel 2 moves in the optical axis direction without rotation, by the engagements between the cam pin 2a provided on the second barrel 2, and the cam groove 8b formed in the cam barrel 8 and the straight groove formed in the fixed barrel 7. A variable magnification is performed by the first barrel 1 and the second barrel 2, i.e. the first lens unit L1 and the second lens unit L2, moving in the optical axis direction.

The aperture unit 5 moves in the optical axis direction without rotation since the cam pin 5a provided at the aperture unit 5 engages with the cam groove 8d formed in the cam barrel 8 and the sleeve portion 5b and the rotation stopper 5c are guided by the guide bars 21 and 22.

A third holding frame 3 moves in the optical axis direction without rotation since the cam pin 3a provided on the third holding frame 3 engages with the cam groove 8c formed in the cam barrel 8 and the sleeve portion 3b and the rotation stopper 3c are guided by the guide bars 21 and 22.

The image pickup element base plate 9 holds an image pickup element 11 constituted by a CCD sensor or a CMOS sensor and an infrared cut/low-pass filter 10. The fixed barrel 7 and the focus base member 6 are fixed on the image pickup element base plate 9 with screws (not shown).

Figure 10:
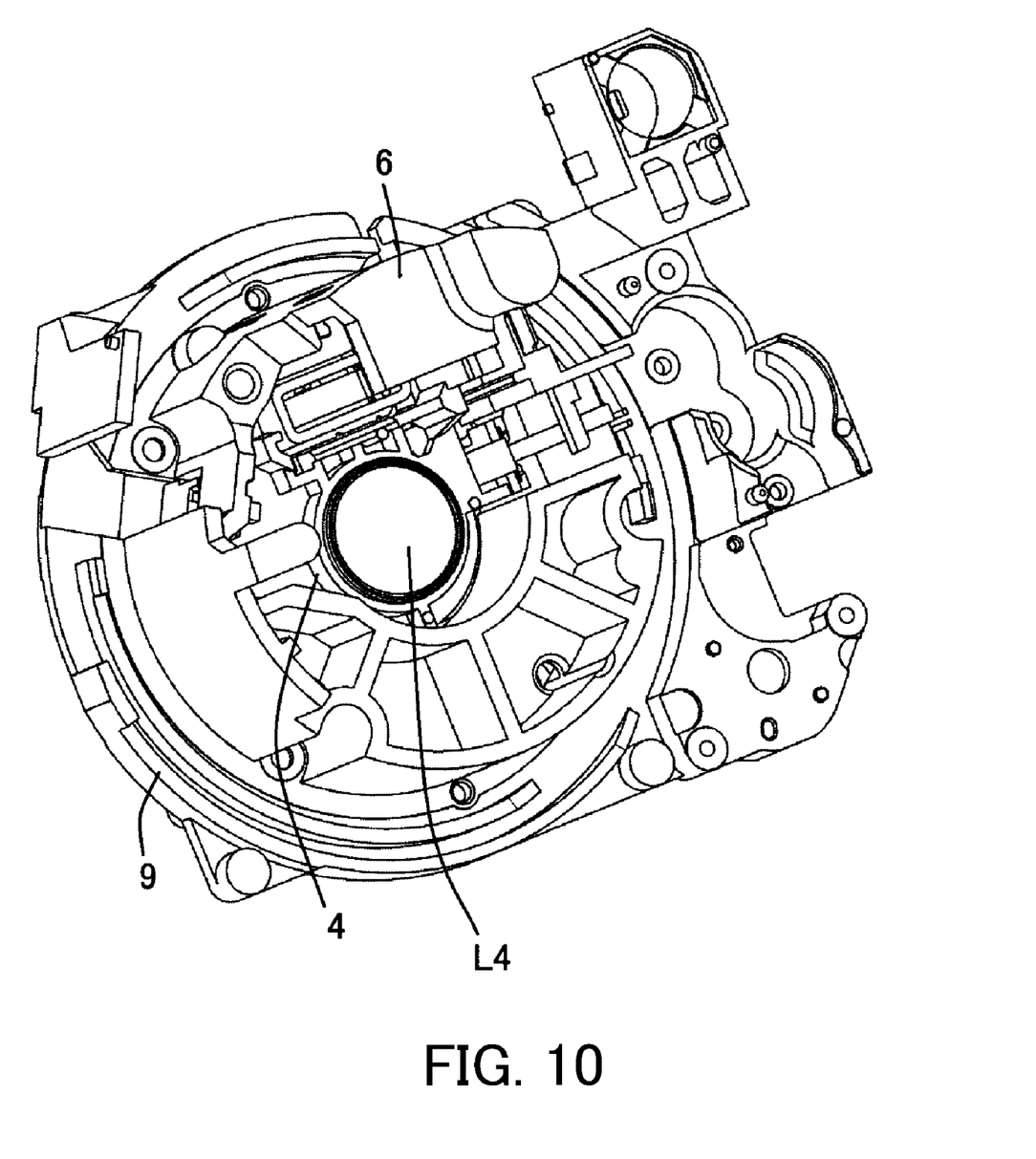
FIG. 10 is a perspective view showing a configuration of a part of the focus drive mechanism.

Next, referring to FIGS. 9 and 10, a focus drive mechanism which drives the fourth holding frame 4 holding the focus lens L4 will be described. FIG. 9 is an exploded perspective view of the focus drive mechanism, and FIG. 10 is a perspective view showing a partially-assembled state of the focus drive mechanism.

An air core coil 41 having a rectangular cylinder shape is fixed on the fourth holding frame 4. An air core portion of the air core coil 41 opens in the optical axis direction. A flexible substrate 42 is connected with the air core coil 41.

Yokes 61 and 62 and a magnet 63 are fixed on the focus base member 6. The yoke 61 has a U-shape and is disposed so that upper and lower surfaces of the yoke 61 extend in the optical axis direction. The magnet 63 is held inside the yoke 61. The yoke 61 is inserted inside the air core coil 41. The air core coil 41 is disposed at a distance of predetermined intervals from the yoke 61 and the magnet 63.

The magnet 63 extends in the optical axis direction as a longitudinal direction, and is magnetized in a direction orthogonal to the optical axis direction. A yoke 62 which has an H-shape is assembled at an open end of the U-shape of the yoke 61. A linear actuator (a voice coil motor) as a focus actuator corresponding to the third actuator is constituted by the coil 41, the yokes 61 and 62, and the magnet 63.

When the electric current is applied to the air core coil 41, due to the action of a magnetic circuit formed by the yokes 61 and 62 and the magnet 63, the fourth holding frame 4 (i.e. the focus lens L4) moves in the optical axis direction, i.e. moves along the optical axis.

An encoder magnet 43 extending in the optical axis direction is attached to the fourth holding frame 4. An MR (magnetoresistance) sensor 67 as a magnetic sensor which is fixed on the focus base member 6 is disposed at a position opposed to the encoder magnet 43. The encoder magnet 43, as well as the fourth holding frame 4, moves with respect to the MR sensor 67 to change magnetic property acting on the MR sensor 67 and also change an output from the MR sensor 67. Based on the output change, a CPU (a controller) 100 shown in FIG. 15 can detect a position of the fourth holding frame 4. The CPU 100 controls the electric current which is applied to the air core coil 41 while referring to position information of the fourth holding frame 4 detected through the MR sensor 67 to move the focus lens L4 to a target position (in-focus position).

Next, referring to FIGS. 11 and 12, a configuration of the anti-shake unit will be described. FIG. 11 is an exploded perspective view of the anti-shake unit, and FIG. 12 is a perspective view showing an assembly completion state of the anti-shake unit.

Magnets 33a and 33b are fixed on the third holding frame 3. The magnets 33a and 33b are disposed in parallel to an X direction and a Y direction which are orthogonal to each other, respectively. The X and Y directions are directions different from each other among directions orthogonal to the optical axis direction.

The third holding frame 3 is held by the sensor holding frame 32 via three coil springs 35 so as to be able to shift in the direction orthogonal to the optical axis direction. The coil spring 35 has also a role of biasing the third holding frame 3 toward the sensor holding frame 32. Balls 36 are disposed between plane portions (not shown) formed at three areas in a circumferential direction on the third holding frame 3 and concave portions 3e formed at three areas in a circumferential direction on the sensor holding frame 32. The ball 36 is clamped by a biasing force of the coil spring 35 between the plane portion and the concave portion 3e. Thus, the third holding frame 3 can be shifted in the direction orthogonal to the optical axis direction without being tilted with respect to the optical axis.

Coils 34a and 34b are fixed on the positions opposed to the magnets 33a and 33b described above in the coil holding frame 31, respectively. The coil holding frame 31 is fixed on the sensor holding frame 32 with a screw (not shown).

A first anti-shake actuator which shifts the third holding frame 3 in the X direction is constituted by the magnet 33a and the coil 34a, and a second anti-shake actuator which shifts the third holding frame 3 in the Y direction is constituted by the magnet 33b and the coil 34b. The first and the second anti-shake actuators correspond to the first and the second actuators, respectively.

When the electric current flows to the coils 34a and 34b, the third holding frame 3 is driven so as to shift to the X and Y directions by the action between the magnetic property generated in the coils 34a and 34b and the magnetic property of the magnets 33a and 33b.

Reference numerals 37a and 37b denote hall sensors as magnetic sensors, and they are held on the sensor holding member 32. The hall sensors 37a and 37b are disposed at positions opposed to the magnet 33a and 33b at predetermined intervals necessary for detecting the magnetic change, respectively. The movements (shifts) of the magnets 33a and 33b as well as the third holding frame 3 with respect to the hall sensors 37a and 37b change magnetic properties acting on the hall sensors 37a and 37b and also change outputs from the hall sensors 37a and 37b. The CPU 100 shown in FIG. 15 is capable of detecting a position of the third holding frame 3 (the correction lens L3) based on the outputs from the hall sensors 37a and 37b.

Figure 15:
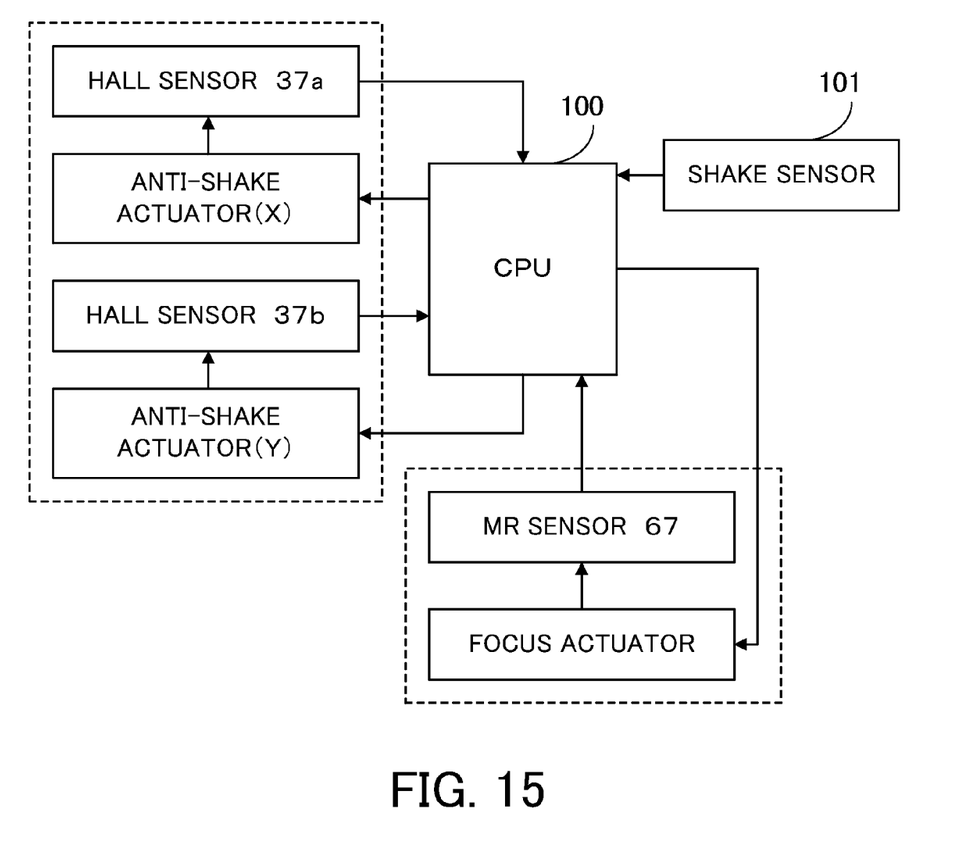
FIG. 15 is a block diagram showing an electric circuit of the image pickup apparatus.

The CPU 100 controls the electric current applied to the coils 34a and 34b based on an output from a shake sensor 101 shown in FIG. 15 and position information of the third holding frame 3 obtained through the hall sensors 37a and 37b to shift the correction lens L3 to a position where an image shake is reduced. Thus, an anti-shake motion is performed.

Figure 13:
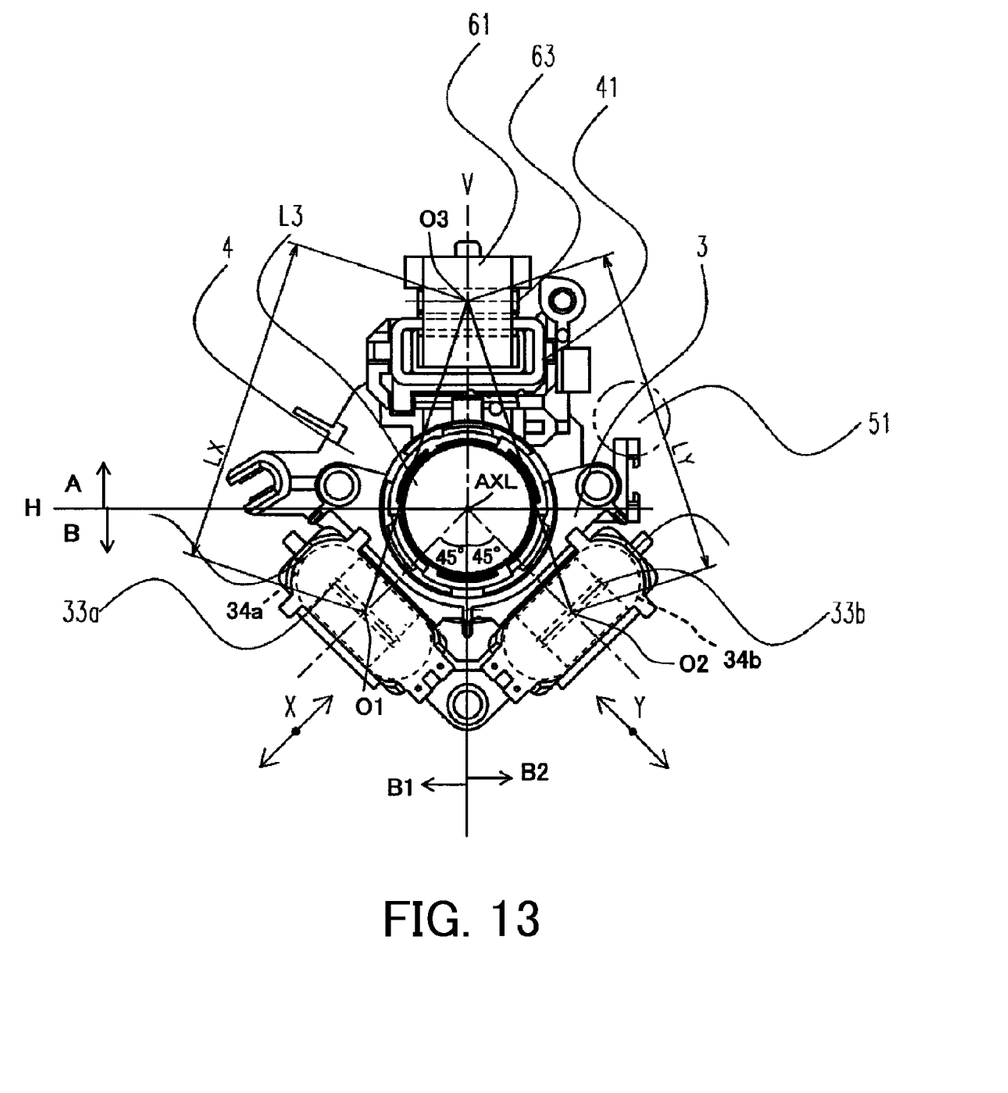
FIG. 13 is an elevation view showing arrangements of the focus drive mechanism (focus actuator) and the anti-shake unit (first and second anti-shake actuators).

Next, referring to FIG. 13, the arrangements of the voice coil motor as a focus actuator described above and the first and second anti-shake actuators will be described. FIG. 13 is a view when the anti-shake unit is viewed from a direction of the optical axis AXL (viewed in the optical axis direction). The embodiment will be described on the assumption of a state where the anti-shake motion is not performed, i.e. on the assumption that the third holding frame 3 (the correction lens L3) is disposed at a neutral position and an optical axis of the correction lens L3 conforms to the optical axis AXL of the optical system.

In FIG. 13, an upper side region and a lower side region with reference to a straight line H which passes through a position of the optical axis AXL and extends in a left and right direction are defined as an A region and a B region, respectively. Further, a left side region and a right side region with reference to a straight line V which passes through positions of the optical axis AXL and the focus actuator and extends in an upward and downward direction are defined as a B1 region and a B2 region, respectively.

The voice coil motors 41, 61, and 63 are disposed in the A region. The first anti-shake actuators 33a and 34a and the second anti-shake actuators 33b and 34b are disposed in the B region opposite to the A region with reference to the optical axis AXL.

In the embodiment, the words "the first anti-shake actuator and the second anti-shake actuator are disposed in the B region" are not limited only to the case where whole of them are included in the B region, but the case where at least centers O1 and O2 of them are disposed in the B region may also be included. In this case, even if an upper portion of the anti-shake actuator is slightly protruded into the A region, the anti-shake actuator is considered to be disposed in the B region if the centers O1 and O2 are positioned in the B region. This is also true for the case where the upper portion of the anti-shake actuator is slightly protruded into the A region by the anti-shake motion.

Each of the centers O1 and O2 of the first and second anti-shake actuators does not have to be one point located at exactly the center, but a point located in a range of the vicinity of the center (central part) may also be acceptable. Furthermore, each of the centers O1 and O2 may be a position of the geometric or areal center of gravity of the anti-shake actuator when viewed in the optical axis direction, or may be the magnetic center or the magnetic center of gravity.

The first and the second anti-shake actuators are disposed in the B1 and the B2 regions, respectively. The words "the first and the second anti-shake actuators are disposed in the B1 and the B2 regions, respectively" involve the case where the first and the second anti-shake actuators are entirely included in the B1 and the B2 regions, respectively. However, the case where at least the centers O1 and O2 are located in the B1 and the B2 regions, respectively, may also be involved.

Thus, in the present embodiment, when viewed in the optical axis direction, the first and the second anti-shake actuators are disposed in the B region opposite to the A region, where the focus actuator is disposed, with reference to the optical axis AXL. Furthermore, the first and the second anti-shake actuators are disposed in the B1 and the B2 regions opposite to each other with reference to the optical axis AXL, respectively.

When viewed in the optical axis direction, in a state where the third holding frame 3 is located at a neutral position, a distance LX between the focus actuator and the first anti-shake actuator and a distance LY between the focus actuator and the second anti-shake actuator are equal to each other. The distance in the embodiment is a distance between a position O3 of the focus actuator and the centers (or central parts) O1 and O2 of the anti-shake actuators.

In other words, in the present embodiment, when viewed in the optical axis direction, the first and the second anti-shake actuators are disposed at positions symmetric to the straight line V passing through a position of the optical axis AXL and the position O3 of the focus actuator.

In the present embodiment, when viewed in the optical axis direction, the focus actuator is disposed at a position at a first distance from the optical axis, and both first and second anti-shake actuators are disposed at positions at a second distance longer than the first distance from the focus actuator.

The first and the second anti-shake actuators which shift the third holding frame 3 to the X and Y directions orthogonal to each other, respectively, are disposed at positions whose phases are different by 90 degrees from each other when viewed in the optical axis direction. Therefore, it could be said that the first and the second anti-shake actuators are disposed so that an angle between a straight line connecting the centers (or central parts) O1 and O2 of them with a position of the optical axis AXL and the straight line V is 45 degrees.

The distances LX and LY do not have to strictly conform to each other, but a difference to the extent that is regarded as distances which conforms to each other can also be acceptable. Further, with regard to the symmetry or the angle of 45 degrees, it does not have to be strictly required, but a value that is in a range regarded as substantially the same as the value described above may be acceptable.

As described above, if the first and the second anti-shake actuators are disposed in the B region (B1 and B2 regions), the distances LX and LY do not have to be equal to each other or do not have to be disposed at a symmetric position or at an angle of 45 degrees described above.

The arrangements of the first and the second anti-shake actuators as described above enable both of them to be positioned away from the focus actuator. As disclosed in Japanese Patent Laid-open No. 2003-295249, compared with the case where two anti-shake actuators are arranged, although a distance between the focus actuator and one anti-shake actuator is rather short, a distance between the focus actuator and the other anti-shake actuator can be extremely lengthened. Therefore, the magnetic interference between the focus actuator and both anti-shake actuators can be relieved. Furthermore, the influence of leakage magnetic flux from both anti-shake actuators for the MR sensor 67 or the influence of leakage magnetic flux from the focus actuator for the hall sensors 37a and 37b can be avoided.

Next, referring to FIG. 14, an arrangement relationship among the focus actuator, the anti-shake actuator, the aperture actuator, the shutter actuator, and the ND actuator when viewed in the optical axis direction will be described.

Figure 14:
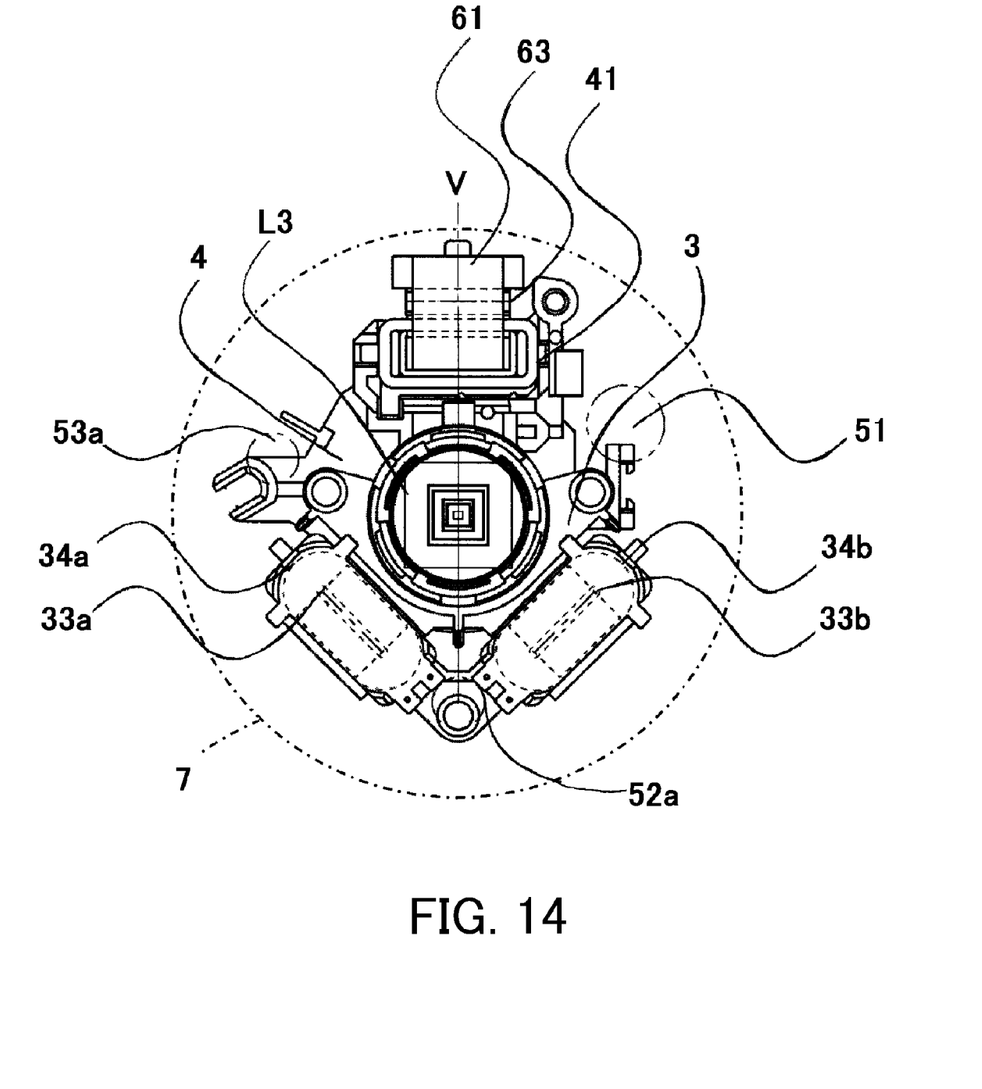
FIG. 14 is an elevation view showing arrangements of the focus drive mechanism (focus actuator), the anti-shake unit (first and second anti-shake actuators), and the aperture unit (aperture actuator, shutter actuator, and ND actuator).

In FIG. 14, as described above, reference numeral 51 denotes an aperture actuator, and reference numeral 52a denotes a magnet which constitutes a shutter actuator 52. Reference numeral 53a denotes a magnet which constitutes an ND actuator 53.

The aperture actuator 51, the shutter actuator 52, and the ND actuator 53 are disposed at regions where they do not overlap with the focus actuator and the first and the second anti-shake actuators when viewed in the optical axis direction. In the shutter actuator 52 and the ND actuator 53, the magnets 52a and 53a are influenced by the magnetic force of other actuators. Therefore, the words "the shutter actuator 52 and the ND actuator 53 are disposed in regions where they do not overlap with the focus actuator and the first and the second anti-shake actuators when viewed in the optical axis direction" mean that the magnets 52a and 53a are disposed at regions where they do not overlap with the focus actuator and the first and the second anti-shake actuators when viewed in the optical axis direction.

Further, in the present embodiment, all of the focus actuator, the first and the second anti-shake actuators, the aperture actuator 51, the shutter actuator 52, and the ND actuator 53 are disposed inside the fixed barrel 7 as a barrel member having a cylindrical shape.

For more details, when viewed in the optical axis direction, the aperture actuator 51 is disposed between the focus actuator and the first anti-shake actuator. The shutter actuator 52 is disposed between the first and the second anti-shake actuators. Further, the ND actuator 53 is disposed between the focus actuator and the second anti-shake actuator.

The focus actuator includes the yoke 61 and the magnet 63 whose lengths in the optical axis direction are long in order to obtain a wide range of the movement of the focus lens L4. Therefore, the aperture actuator 51 is disposed so as not to overlap with the focus actuator when viewed in the optical axis direction in order to be arranged with high space efficiency.

In the configurations of the first and the second anti-shake actuators in the present embodiment, most of the magnetic force of the magnet of each anti-shake actuator is emitted in the optical axis direction. Therefore, the shutter actuator 52 and the ND actuator 53 are disposed so as not to overlap with the first and the second anti-shake actuators when viewed in the optical axis direction, in order not to be influenced by the magnetic interference.

In the present embodiment, a magnetic shield plate 64 is disposed on both side planes of the focus actuator to reduce the leakage magnetic flux from the focus actuator. Thus, combined with the arrangement of the anti-shake actuator with respect to the focus actuator described above, the magnetic interference between these actuators can be reduced.

Further, in the present embodiment, the focus actuator is long in the optical axis direction. Therefore, the focus actuator is disposed so as to be positioned above the lens barrel in the case where the image pickup apparatus is used at a common and normal position so that ghost or flare is not generated by light reflected on the focus actuator. In this case, the two anti-shake actuators are positioned under the lens barrel.

FIG. 15 shows a configuration of the electric circuit including the CPU 100, the shake sensor 101, the first and the second anti-shake actuators X and Y, the hall sensors 37a and 37b, the focus actuator, and the MR sensor 67, each of which has been described above. The shake sensor 101 is constituted by an angle velocity sensor, an acceleration sensor, or the like, and outputs a signal in accordance with a shake of the image pickup apparatus. The CPU 100 amplifies the signal from the shake sensor 101 and also integrates it to generate a shake displacement signal in order to calculate a target position to shift the third holding frame 3 (the correction lens L3) based on the shake displacement signal.

The CPU 100 applies the electric current depending on the difference between the calculated target position and the position of the third holding frame 3 detected by signals from the hall sensors 37a and 37b to the coils 34a and 34b of the first and the second anti-shake actuators. Thus, the CPU 100 performs a feedback control of the first and the second anti-shake actuators to shift the correction lens L3 to the target position.

As described above, according to the above embodiment, when viewed in the optical axis direction, the focus actuator, the first and the second anti-shake actuators, the aperture actuator, the shutter actuator, and the ND actuator are disposed so as not to overlap with one another. Therefore, the magnetic interference among these actuators can be relieved. Further, because all of these actuators are disposed inside the fixed barrel (barrel member), the lens barrel can be miniaturized. In addition, a lens barrel including these actuators and capable of performing a stretching motion can also be realized.

According to the above embodiment, because the first and the second anti-shake actuators are disposed sufficiently away from the focus actuator, the magnetic interference between the first and the second anti-shake actuators and the focus actuator can be relieved. When a magnetic sensor is used for detecting a position of the focus lens or the correction lens, the magnetic influences by the first and the second anti-shake actuators or the focus actuator with respect to the magnetic sensor can be reduced.

As described above, according to the present embodiment, when viewed in the optical axis direction, all of the first to the fourth actuators are disposed so as no to overlap with one another. Therefore, the magnetic interference among these first to the fourth actuators can be relieved. Further, because all of the first to the fourth actuators are disposed inside the barrel member, the lens barrel can be miniaturized, in addition, a lens barrel including the first to the fourth actuators and capable of performing a stretching motion can also be realized.

For example, in the above embodiment, the aperture actuator is disposed between the focus actuator and the first anti-shake actuator, and the shutter actuator is disposed between the first and the second anti-shake actuators. Further, the ND actuator is disposed between the focus actuator and the second anti-shake actuator. However, the arranged positions of the aperture actuator, the shutter actuator, and the ND actuator may also be replaced with each other.

In the above embodiment, the case where three actuators of the aperture actuator, the shutter actuator, and the ND actuator as a fourth actuator are included has been described. However, the present invention is not limited to the case where all of these three actuators are included, but is applicable to the case where one or two, i.e. at least one, fourth actuators are provided.

Further, the arrangement relation of the actuators in the above embodiment is simply one example. In other words, when viewed in the optical axis direction, the aperture actuator, the shutter actuator, and the ND actuator have only to be disposed so as not to overlap with the focus actuator and the first and the second anti-shake actuators which are disposed so as not to overlap with each other.

In the above embodiment, the case where a magnetic sensor is used for detecting a position of the correction lens or the focus lens has been described, but instead of this, an optical sensor may also be used.

In the above embodiment, an image pickup apparatus has been described, but the present invention is also applicable to an interchangeable lens (an optical apparatus).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-236456, filed on Sep. 16, 2008, which is hereby incorporated by reference herein in its entirety.

What is claimed is:

1. An optical apparatus comprising:
   an anti-shake lens capable of shifting with respect to an optical axis of an optical system;
   a movable lens unit, which includes a movable lens, capable of moving along the optical axis;
   a light intensity controlling member configured to control light intensity passing through the optical system;
   first and second actuators, each of which includes a magnet and a coil, configured to shift the anti-shake lens in directions different from each other;
   a third actuator, which includes a magnet and a coil, configured to move the movable lens along the optical axis, wherein either the coil or the magnet is fixed on the movable lens unit;
   a fourth actuator configured to operate the light intensity controlling member to the light pass; and
   a barrel member which contains the anti-shake lens, the movable lens, the light intensity controlling member, and the first to the fourth actuators,
   wherein the first to the fourth actuators are disposed inside the barrel member so as not to overlap with one another when viewed in an optical axis direction.

2. An optical apparatus according to claim 1,
   wherein the fourth actuator is disposed between the first and the second actuators when viewed in the optical axis direction.

3. An optical apparatus according to claim 1,
   wherein the first and the second actuators are disposed at regions opposite to a region where the third actuator is disposed with reference to the optical axis, and are disposed at the regions opposite to each other with reference to the optical axis.

4. An optical apparatus according to claim 1,
wherein a distance between the first and the third actuators and a distance between the second and the third actuators are equal to each other in a state where the antishake lens are at a neutral position when viewed in the optical axis direction.

5. An optical apparatus according to claim 1,
wherein the third actuator is disposed at a first distance from the optical axis and both the first and the second actuators are disposed at a second distance longer than the first distance from the third actuator when viewed in the optical axis direction.

6. An optical apparatus according to claim 1,
wherein the first and the second actuators are disposed at a position symmetric to a straight line passing through a position of the optical axis and the third actuator when viewed in the optical axis direction.

7. An optical apparatus according to claim 1,
wherein the magnet and the coil which constitute each of the first and the second actuators are disposed so as to overlap with each other when viewed in the optical axis direction.

8. An optical apparatus according to claim 1,
wherein the barrel member is a member which constitutes a lens barrel performing a stretching motion in the optical axis direction.

9. An optical apparatus according to claim 1,
wherein the light intensity controlling member is any one of a shatter unit, a diaphragm unit and ND filter unit.

10. An optical apparatus according to claim 1,
wherein the magnet expands in the optical axis direction as a longitudinal direction, and is magnetized in a direction orthogonal to the optical axis direction.

* * * * *